(12) United States Patent
Johansson et al.

(10) Patent No.: US 11,574,136 B2
(45) Date of Patent: *Feb. 7, 2023

(54) ACTIVATION FOR NEAR-FIELD COMMUNICATION DEVICE

(71) Applicant: Yubico AB, Stockholm (SE)

(72) Inventors: Jesper Mikael Johansson, Redmond, WA (US); Christopher Harrell, San Jose, CA (US)

(73) Assignee: Yubico AB, Stockholm (SE)

( * ) Notice: Subject to any disclaimer, the term of this patent is extended or adjusted under 35 U.S.C. 154(b) by 161 days.

This patent is subject to a terminal disclaimer.

(21) Appl. No.: 16/751,097

(22) Filed: Jan. 23, 2020

(65) Prior Publication Data

US 2020/0160002 A1 May 21, 2020

Related U.S. Application Data

(63) Continuation of application No. 16/175,689, filed on Oct. 30, 2018, now Pat. No. 10,579,839.

(51) Int. Cl.
*G06K 7/10* (2006.01)
*G06F 21/44* (2013.01)
*H04B 5/00* (2006.01)

(52) U.S. Cl.
CPC ......... *G06K 7/10247* (2013.01); *G06F 21/44* (2013.01); *H04B 5/0012* (2013.01); *H04B 5/0031* (2013.01)

(58) Field of Classification Search
CPC .......... G06F 21/44; G06F 21/74; G06F 21/35; G06F 21/79; G06F 1/3206; G06F 21/30; G06F 9/24; H04M 1/72412; H04M 2250/04; H04M 1/157; H04M 1/71; H04M 1/72; H04M 1/72409; H04M 1/72454;

(Continued)

(56) References Cited

U.S. PATENT DOCUMENTS 9,603,090 B2 3/2017 Khan et al.
9,800,570 B1 10/2017 Bleisch (Continued)

FOREIGN PATENT DOCUMENTS

CA 2875362 A1 * 12/2012 ............. B65D 25/20

OTHER PUBLICATIONS

Extended European Search Report, European Application No. 19201012.2, dated Dec. 11, 2019, 8 pages.
Canadian Office Action, Canadian Intellectual Property Office Patent Application No. Application No. 3,054,430, dated Apr. 26, 2022, 4 pages.

(Continued)

*Primary Examiner* — Dionne Pendleton
(74) *Attorney, Agent, or Firm* — Fenwick & West LLP

(57) ABSTRACT

An authorization device having an activation module and a wireless interface is configured in a non-enabled mode. In the non-enabled mode, the wireless interface is configured to receive data, and the authorization device is configured to block a request received via the wireless interface to interact with the authorization device. The activation module detects an activation operation. In response to detecting the activation operation, the activation module configures the authorization device in an enabled mode. In the enabled mode, the authorization device is configured to process a request to re-configure the authorization device received via the wireless interface, and to transmit authorization information to a reader device via the wireless interface.

17 Claims, 3 Drawing Sheets

(58) Field of Classification Search
CPC ......... H04M 1/72463; H04M 2250/02; H04M 2250/06; H04M 2250/10; H04M 2250/12; H04M 2250/22; H04M 2250/52; G06K 7/10247; G06K 7/10297; G06K 19/06206; G06K 7/0004; G06K 7/10237; G06K 19/0727; G06K 19/07345; G06K 19/07372; G06K 7/0008; G06K 7/10009; G06K 7/10227; G06K 7/10287; H04B 5/0012; H04B 5/0031; H04B 2203/5416; H04B 2203/5437; H04B 2203/5445; H04B 2203/545; H04B 2203/5458; H04B 2203/5483; H04B 3/542; H04B 5/02; H04B 3/54; H04L 63/0492; H04L 63/06; H04L 63/08; H04L 63/083; H04L 63/1425; H04L 67/306; H04L 63/105; H04L 63/0428; H04L 67/125; H04L 63/102; H04W 12/08; H04W 4/80; H04W 12/02; H04W 12/03; H04W 12/06; H04W 12/065; H04W 12/068; H04W 12/12; H04W 12/082; H04W 12/37; H04W 4/023; H04W 4/027; H04W 52/0261; H04W 12/33; H04W 12/40; H04W 12/47; G06Q 20/3224; G06Q 20/3278; G06Q 20/40145; G06Q 20/3227; G06Q 20/341; G06Q 20/354; G06Q 20/3552; G06Q 20/3263; G06Q 50/265; G06Q 20/32

See application file for complete search history.

(56) References Cited

U.S. PATENT DOCUMENTS

| | | | |
|---|---|---|---|
| 10,579,839 B1* | 3/2020 | Johansson | H04L 63/0492 |
| 2006/0219776 A1 | 10/2006 | Finn | |
| 2008/0091605 A1* | 4/2008 | Hughes | G06F 21/31 705/51 |
| 2013/0068835 A1 | 3/2013 | Zanzot et al. | |
| 2013/0344859 A1* | 12/2013 | Abramson | H04M 1/72463 455/418 |
| 2016/0290838 A1 | 10/2016 | Mudireddy et al. | |
| 2016/0358172 A1 | 12/2016 | Ziat et al. | |
| 2016/0360352 A1 | 12/2016 | Khan et al. | |
| 2017/0011395 A1 | 1/2017 | Pillai et al. | |
| 2017/0154328 A1 | 6/2017 | Zarakas et al. | |
| 2017/0272316 A1 | 9/2017 | Johnson et al. | |
| 2017/0272413 A1 | 9/2017 | Adams et al. | |
| 2017/0293911 A1* | 10/2017 | Vyas | G06K 19/06206 |
| 2017/0346851 A1 | 11/2017 | Drake | |
| 2017/0357936 A1 | 12/2017 | Byington et al. | |
| 2018/0091538 A1* | 3/2018 | Narayanan | H04W 12/068 |
| 2019/0081788 A1 | 3/2019 | Rose et al. | |
| 2022/0000183 A1* | 1/2022 | Kersey | H02J 7/0048 |

OTHER PUBLICATIONS

European Office Action, European Patent Office Application No. 19201012.2, dated Apr. 25, 2022, 6 pages.

* cited by examiner

ACTIVATION FOR NEAR-FIELD COMMUNICATION DEVICE

BACKGROUND

Field of Disclosure

The present invention generally relates to activation of a near-field communication device, such as an NFC authorization device.

Description of the Related Art

Near-field communication (NFC) protocols allow two NFC-enabled devices to establish a wireless connection when brought into proximity to each other, e.g., within a few centimeters. NFC devices are used for facility entry, contactless payments (e.g., when incorporated into credit cards), key fobs, social networking, user authorization, and other applications. Many NFC devices are configurable, allowing a connected device to both read data from the NFC device and modify the data stored by the NFC device, or change one or more operational parameters of the NFC device. When users acquire new NFC devices, they expect the NFC devices to be in an unconfigured state or in a default configuration. However, because NFC devices can communicate wirelessly, it is currently possible for malicious actors using unauthorized devices to tamper with new NFC devices before they reach their intended users. For example, unauthorized actors may wirelessly activate or reconfigure an NFC device while it is in its original packaging, e.g., while the NFC device is being shipped, or sitting on a store shelf. Depending on the type of NFC device, the unauthorized tampering can make it difficult or even impossible for users to re-program acquired NFC devices for their own use. Moreover, unauthorized modification may introduce attack vectors onto device, which creates a security risk when the devices reach their end users.

SUMMARY

The above and other issues are addressed by a method for activating an NFC device and by an NFC device configured to be activated after being removed from its packaging. The NFC device is configured in a non-enabled mode after manufacture, and the NFC device remains in the non-enabled mode until it is activated by an end user or other authorized user, such as an IT administrator. In the non-enabled mode, the NFC device may be configured so that an unauthorized user is prevented from configuring, activating, or otherwise tampering with the NFC device. This protects the NFC device during shipping and storage. Alternatively, for certain devices where it is not feasible to prevent tampering with or reading the device in its packaging, the device may be tamper evident, making it obvious to the end-user that the device has been tampered with. In some embodiments, the NFC device is an authorization device that provides authorization information, such as a password, when read by another NFC device, such as a computer or smartphone.

In some embodiments, the NFC device has an activation sensor, and the NFC device enters the enabled mode in response to detecting a physical activation at the activation sensor. The activation sensor may be, for example, a touch sensor or a physical connector, such as a USB port, or it may be in the NFC radio stack itself. If the NFC device has a physical connector or touch sensor and is enclosed in a packaging, such as a box or a blister pack, the NFC device cannot detect the physical activation until it is removed from the packaging; for example, the NFC device cannot be touched or plugged in while it is in its packaging. In some embodiments, a configuration module of the NFC device is disabled or in a limited functionality mode until physical activation, which prevents unauthorized devices from reconfiguring the NFC device until it is activated. In other embodiments, the NFC interface is disabled until physical activation, which prevents unauthorized devices from wirelessly connecting to the NFC device until it is activated, or receive out of band communications. Evidence that an unauthorized user has gained access to the NFC device would be apparent to a user from the tampered packaging.

In some embodiments, the NFC device can wirelessly communicate while it is in the packaging, but the NFC device is configured to send a flag value indicating that it is unconfigured and has not been read until it has been read a first time. After another device reads the NFC device a first time, the flag is removed. Thus, the authorized end user can determine whether the NFC device has been tampered with based on whether the unread flag is received before the authorized user first reads the NFC device.

In some embodiments, the non-enabled mode includes operating modes with low functionality. In some embodiments, the NFC device can wirelessly communicate while it is in the packaging, but the NFC device has limited functionality until it receives an activation signal at the NFC interface. For example, in the non-enabled mode, the NFC device is able to transmit information for activating the NFC device to a connected device via the NFC interface. The connected device performs an activation process on behalf of an authorized user, and transmits the activation signal to the NFC device. The activation process is designed to prevent an unauthorized user from activating the NFC device. For example, an activation code may be printed in the NFC device's packaging, so that the NFC device cannot be configured until the packaging has been opened. Evidence that an unauthorized user has gained access to the activation code would be apparent from the tampered packaging.

A method for activating an authorization device is described herein. An authorization device having an activation module, an authorization module, and a wireless interface is configured in a non-enabled mode. The authorization device detects an activation operation at the activation module. In response to detecting the activation operation, the activation module configures the authorization device in an enabled mode. In the enabled mode, the authorization module is configured to transmit authorization information to a reader device via the wireless interface. The wireless interface detects the reader device within a wireless range of the authorization device and, in response to detecting the reader device, transmits the authorization information from the authorization module to the reader device.

An authorization device having an activation module, a wireless interface, and an authorization module is also described herein. The activation module is configured to detect an activation operation and, in response to the activation operation, change an operational state of the authorization device from a non-enabled mode to an enabled mode. The wireless interface is configured, in the enabled mode, to detect a reader device within a wireless range of the authorization device and wirelessly exchange information with a reader device. The authorization module is configured, in the enabled mode, to transmit authorization information to the reader device via the wireless interface.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures.

Figure 1:
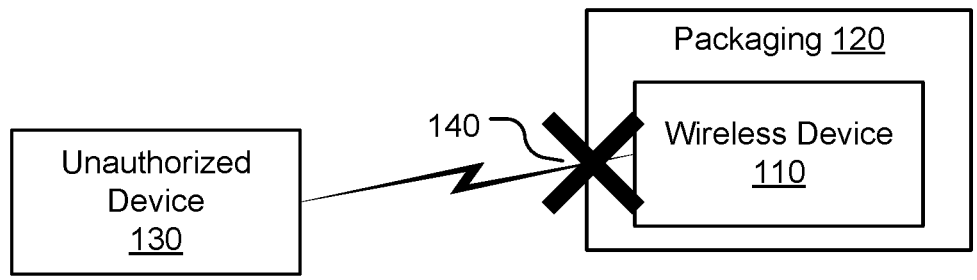
FIG. 1 is a high-level block diagram illustrating an environment for a wireless device, according to an embodiment.

FIG. 1 is a high-level block diagram illustrating an environment 100 for a wireless device 110, according to an embodiment. The wireless device 110 is any device capable of wirelessly communicating with at least one other device. For example, the wireless device 110 may be a near-field communication (NFC) device configured to wirelessly communicate using NFC protocol. In other embodiments, the wireless device 110 may be a radio frequency identification (RFID) tag, a proximity card, a smart card, a BLUETOOTH device, or other type of device configured to wirelessly communicate. The wireless device 110 may be a read-only device that is programmed a single time with information. Alternatively, the wireless device 110 is a configurable device that can be reprogrammed or reconfigured. In some embodiments, the wireless device 110 can be configured by an external device, either via the wireless connection or by a second type of connection, such as a universal serial bus connection (e.g., USB-A, USB-C, USB-C, etc.), or Lightning connection.

The wireless device 110 is enclosed in a packaging 120. The packaging 120 completely encloses the wireless device 110, and the wireless device 110 is accessed by opening the packaging 120. For example, the packaging 120 is a box, a blister pack, a plastic clamshell, or any other type of container. In some embodiments, the packaging 120 is tamper-proof or tamper-resistant, so that opening or tampering with the packaging 120 provides visible evidence. While the wireless device 110 is enclosed in the packaging 120, the wireless device 110 is in a non-enabled mode. After the wireless device 110 is removed from the packaging 120, a user can activate the wireless device 110. Activating the wireless device 110 causes the wireless device 110 to switch from the non-enabled mode to an enabled mode, in which additional components or functions of the wireless device 110 are enabled.

The environment 100 also includes an unauthorized device 130. The unauthorized device 130 is a device that is capable of connecting to the wireless device 110 using a communication protocol that the wireless device 110 understands, but the unauthorized device 130 is not authorized to connect to the wireless device 110. For example, the unauthorized device 130 belongs to a person or entity that has not purchased or been authorized to use the wireless device 110. The unauthorized device 130 attempts to connect to the wireless device 110 via a wireless connection 140 and tamper with the wireless device 110. For example, the unauthorized device 130 may attempt to reprogram, reconfigure, or activate the wireless device 110. The packaging 120 alone does not prevent an unauthorized device 130 from connecting to the wireless device 110. However, the wireless device 110 is configured in a non-enabled mode while it is enclosed in the packaging 120, and the non-enabled mode prevents the unauthorized device 130 from tampering with the wireless device 110. This is indicated by the X in FIG. 1. For example, while the wireless device 110 is in the non-enabled mode, the unauthorized device 130 may not be able to form the wireless connection 140 to the wireless device 110 (e.g., because a wireless interface of the wireless device 110 is disabled), or the wireless device 110 may not accept data transmitted by the unauthorized device 130.

In one particular embodiment referred to throughout the remainder of the specification, the wireless device 110 is an NFC device that provides authorization information for a user to another device. While the example of an NFC device is described in detail here, is appreciated that in other embodiments a wireless device can be used for different purposes, and a wireless device can wirelessly communicate using different protocols. For example, the wireless device may be a BLUETOOTH-enabled device, or include a radio-frequency identification (RFID) tag. Thus, references to an NFC device could equally apply to other types of wireless communication devices in other embodiments.

Figure 2A:
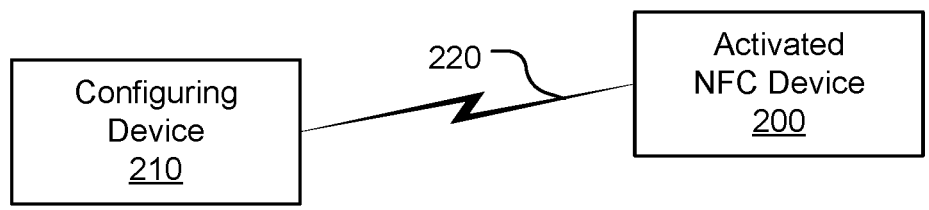
FIG. 2A is a block diagram illustrating configuration of an activated NFC device, according to an embodiment.

FIG. 2A is a block diagram illustrating configuration of an activated NFC device 200. The activated NFC device 200 is an example of the wireless device 100 that has been removed from its packaging, such as the packaging 120, and activated by a user. In this example, the activated NFC device 200 is an authorization device that can be used to authorize a user for a device, website, software product, file, or other feature. The activated NFC device 200 is able to communicate with other devices using an NFC protocol.

As shown in FIG. 2A, the activated NFC device 200 is not encased by packaging, such as the packaging 120 shown in FIG. 1. After the NFC device 200 is removed from its packaging and activated, the activated NFC device 200 can be configured by a configuring device 210. The configuring device 210 may be a device that includes an NFC interface for communicating with the activated NFC device 200 over an NFC connection 220. Alternatively, the configuring device 210 may have a port with which the activated NFC device 200 can connect, either directly or via a cable, to communicate with the configuring device 210. The configuring device 210 is able to carry out a configuration process with the activated NFC device 200. For example, the configuring device 210 may be a computer, tablet, or smartphone that can access a web page that initiates a configuration process. The configuring device 210 transmits configuration information to the NFC device 200, and the NFC device 200 stores this configuration information locally and uses it to generate authorization information, such as a one-time passcode.

Figure 2B:
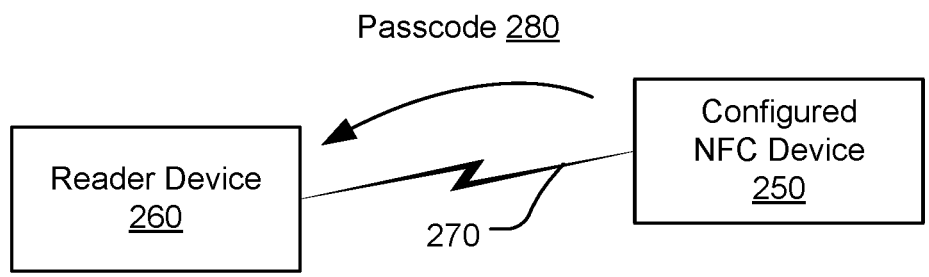
FIG. 2B is a block diagram illustrating the reading of a configured NFC device, according to an embodiment.

FIG. 2B is a block diagram illustrating the reading of a configured NFC device 250. The configured NFC device 250 connects to a reader device 260 via an NFC connection 270. The reader device 260 is a device, such as a computer, tablet, or smartphone, that includes an NFC interface for communicating with the configured NFC device 250 over the NFC connection 270. In some embodiments, the reader device 260 is the same device as the configuring device 210. The reader device 260 requires authorization information for the user to grant the user access to the reader device 260, or some feature or functionality of the reader device, such as an application, a website, or a file. The reader device 260 provides power to the configured NFC device 250 and transmits a request for authorization information, e.g., a one-time passcode. The configured NFC device 250 provides the passcode 280 via the NFC connection 270 responsive to the request. The reader device 260 receives the passcode 280 and, in response, authorizes the user to access the reader device 260 or a feature on the reader device 260.

Figure 3:
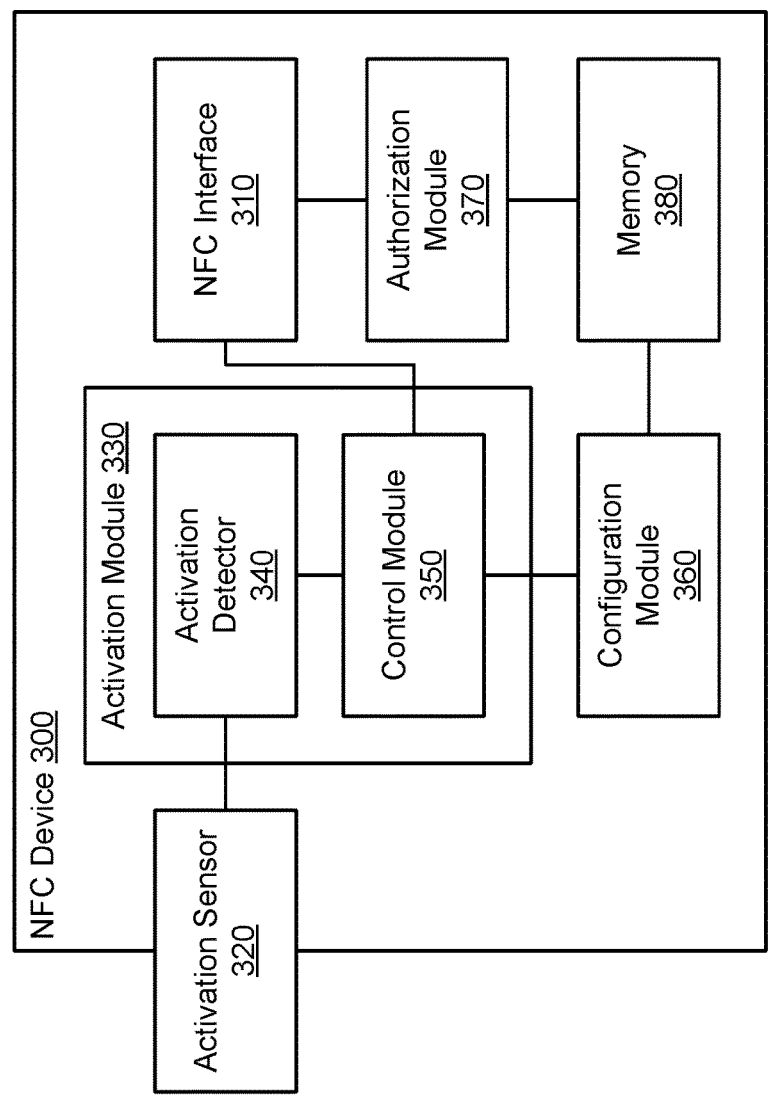
FIG. 3 is a block diagram illustrating an NFC device, according to one embodiment.

FIG. 3 is a block diagram illustrating an NFC device 300, according to one embodiment. The NFC device 300 includes an NFC interface 310, an activation sensor 320, an activation module 330, a configuration module 360, an authorization module 370, and a memory 380. Some embodiments of the NFC device 300 have different modules than those described here. The functions can be distributed among the modules in a different manner than is described here.

The NFC device 300 includes an NFC interface 310 that forms a wireless connection with a connected device, such as the configuring device 210 and the reader device 260. The NFC interface 310 allows other modules of the NFC device 300 to transmit information to and receive information from the connected device. The NFC interface 310 is configured to receive and transmit communications according to a standardized NFC protocol and data format, such as ECMA-340 and ISO/IEC 18092, or ECMA-352 and ISO/IEC 21481. The NFC interface 310 is also configured to receive power supplied by the connected device via the NFC connection. In an embodiment, the NFC interface 310 is disabled until the NFC device 300 is activated. Disabling the NFC interface 310 prevents unauthorized devices from wirelessly connecting to the NFC device 300 while the NFC device 300 is housed in the packaging.

The activation sensor 320 is a sensor for sensing a physical activation operation. A physical activation operation is an operation that cannot be performed while the NFC device 300 is in enclosed by packaging, such as the packaging 120. As one example, the activation sensor 320 is a physical connector, such as universal serial bus (USB) connector (e.g., USB type A connector, USB type B connector, USB type C connector, USB mini connector, or any other type of USB connector), a Lightning connector, or a Thunderbolt connector. The physical connector may be a receptacle (female connector) or a plug (male connector). The physical connector may be configured to sense a data connection, a power connection, or either a data connection or a power connection. For example, if the physical connector is a USB-C plug, the physical connector may sense a power connection when plugged into a wall socket via a charger, and a data connection when plugged into a computer. The physical connector may perform multiple functions. For example, while the NFC device 300 is in the non-enabled state, the physical connector is used as an activation sensor 320. After the NFC device has been activated, the physical connector may be used to power the NFC device 300 or exchange data with another device over a physical connection.

As another example, the activation sensor 320 is a touch sensor that detects a human touch, such as a touch or press of a user's fingertip or thumb. The touch sensor can be implemented as a capacitance switch, a resistance touch switch, or a piezo touch switch. In other embodiments, the activation sensor 320 is a biometric sensor, such as a biometric reader for reading a fingerprint. As with the physical connector, the touch sensor or biometric sensor may perform multiple functions. For example, while the NFC device 300 is in the non-enabled mode, the touch sensor is used as an activation sensor 320. After the NFC device has been activated, the touch sensor may receive an input from the user instructing the NFC device 300 to release a passcode to the reader device 260. As another example, in the non-enabled mode, a biometric sensor may detect a touch of any fingerprint, and after the NFC device has been activated, the biometric sensor is configured to detect one or more particular finger prints, e.g., the right index fingerprint of the end user. In other embodiments, the activation sensor 320 is a button, a switch, or any another actuator that becomes accessible when the NFC device 300 is removed from the packaging.

The activation module 330 is configured to detect an activation operation at the activation sensor 320 and, responsive to the activation operation, activate the NFC device 300. The activation module 330 includes an activation detector 340 and a control module 350. The activation detector 340 monitors signals from the activation sensor 320 to determine if an activation operation has been performed on the activation sensor 320. For example, if the activation sensor is a physical connector, the activation detector 340 detects a physical device connection, e.g., when the physical connector receives power or a data signal. If the activation sensor is the touch sensor or a biometric sensor, the activation detector 340 detects that the touch sensor or biometric sensor senses a touch. If the activation detector 340 detects an activation operation, the activation detector transmits a signal to the control module 350 indicating that an activation operation has been detected.

The control module 350 configures the NFC device 300 in either the non-enabled mode or the enabled mode. The control module 350 holds the NFC device 300 in the non-enabled mode until activation, and the control module 350 configures the NFC device 300 in the enabled mode after activation. The control module 350 initially configures the NFC device 300 in the non-enabled mode after manufacture and any testing performed prior to shipment. In the non-enabled mode, the control module 350 disables one or more other modules of the NFC device 300, or instructs one or more modules to function in a low-functionality state. For example, the control module 350 may disable the NFC interface 310 and/or the configuration module 360. As another example, the control module 350 instructs the configuration module 360 to block any requests to interact with the NFC device 300 in the non-enabled mode, such as requests to re-configure or read the NFC device 300. As another example, the control module 350 instructs the NFC interface 310 to receive power for the NFC device 300, but to ignore any data transmissions, which serves to block unauthorized read or re-configuration requests. In response to receiving the signal from the activation detector 340 indicating that an activation operation has been detected, the control module 350 configures the NFC device 300 in the enabled mode. In particular, the control module 350 transmits instructions to any modules that, in the non-enabled mode, were disabled or in low-functionality more (e.g., the NFC interface 310 or the configuration module 360) to enable these modules.

The configuration module 360 configures the NFC device 300 so that the NFC device 300 can provide authorization information for the user. For example, the configuration module 360 may receive instructions for generating a one-time passcode for a user to allow the user to access a device, software, application, website, etc. The instructions may include one or more of a timestamp, a static passcode incorporated into the one-time passcode, parameters used to generate the one-time passcode, an encryption scheme for the one-time passcode, a username or other identifying information of the user, or other information. During the configuration process, the configuration module 360 may provide information to the configuring device 210, such as a serial number, counter values, or other information stored in the memory 380. The configuration module 360 stores configuration instructions received from the configuring device 210 in the memory 380. In some embodiments, the NFC device 300 is programmed with a static configuration, and the NFC device 300 cannot be reconfigured. In other embodiments, the NFC device 300 is reconfigurable, and the configuration module 360 can receive new or updated configurations instructions, and update the configuration of the NFC device 300 accordingly.

In some embodiments, the configuration module 360 is disabled until the NFC device 300 is activated, and the control module 350 transmits an enable signal to the configuration module 360. Disabling the configuration module 360 until activation blocks unauthorized devices from programming or re-configuring the NFC device 300 while the NFC device 300 is housed in the packaging. In such embodiments, the NFC interface 310 may or may not also be disabled or in a reduce functionality mode until activation.

During configuration, the NFC device 300 may communicate with the configuring device 210 via either a physical connector or via the NFC interface 310. As an example, the activation sensor 320 is a touch sensor, and the NFC interface 310 is disabled in the non-enabled mode. To configure the NFC device 300, a user first touches the touch sensor to enable the NFC interface 310, and then the NFC interface 310 connects to an NFC-enabled configuring device 210 to perform a configuration process via the enabled NFC interface 310.

As another example, the configuration module 360 performs the configuration process with a physically connected configuring device 210. This may occur during the activation process, e.g., if the activation sensor 320 is a physical connector. To activate and configure the NFC device 300, the user physically connects the NFC device 300 to a configuring device via the physical connector. This physical connection activates the NFC device 300, and the physical connection is also used to perform the configuration process. In an embodiment, the NFC device 300 does not include the activation detector 340, and instead, the control module 350 configures the NFC device 300 in the enabled mode responsive to the configuration module 360 receiving configuration instructions for the NFC device 300.

The authorization module 370 generates authorization information, such as a one-time passcode. The authorization module 370 retrieves the configuration instructions stored in the memory 380 and generates the authorization information based on the configuration instructions. In some embodiments, the authorization module 370 stores additional data for generating the authorization information, such as counters, in the memory 380 and retrieves this additional data from the memory 380. The authorization module 370 generates the authorization information based on a request. The request may be received directly from a user, such as via a touch sensor or button. Alternatively, the request may be received from the reader device 260 to which the user is seeking access. The authorization module 370 transmits the authorization information to the reader device 260 responsive to the request, and the reader device 260 reads the authorization information. The NFC device 300 is configured to transmit authorization information via the NFC interface 310. In some embodiments, the NFC device 300 is also configured to transmit authorization information via a physical connector, e.g., if the user plugs the NFC device 300 into a port of the reader device 260.

Figure 4:
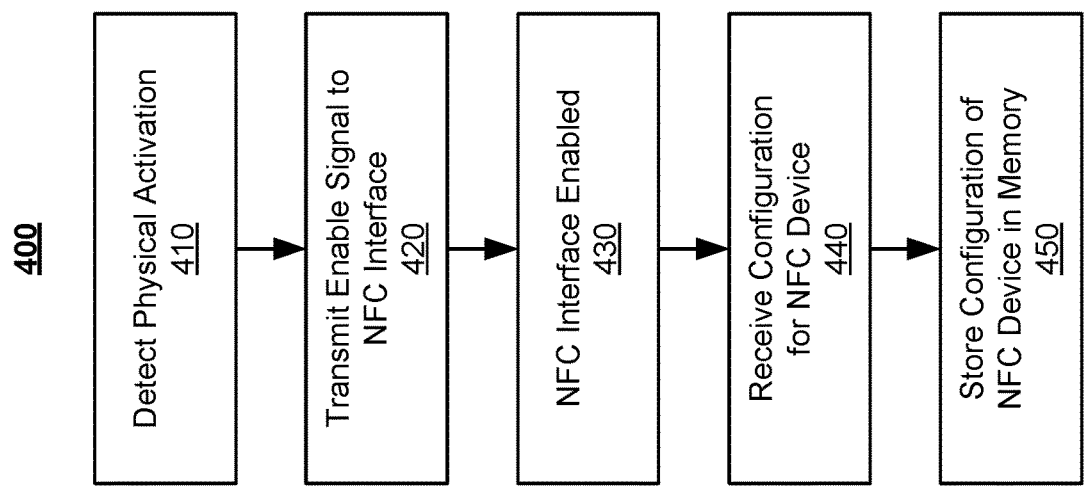
FIG. 4 is a flowchart illustrating a process for activating the NFC device shown in FIG. 3, according to one embodiment.

FIG. 4 is a flowchart illustrating a process 400 for activating the NFC device 300 shown in FIG. 3, according to one embodiment. The activation module 330 detects 410 a physical activation of the NFC device 300. For example, the activation detector 340 detects an activation operation sensed by the activation sensor 320, such as a power connection at a physical connector, or a touch of a touch sensor.

The activation module 330 transmits 420 an enable signal to the NFC interface 310 in response to detecting the physical activation. For example, the control module 350 receives a signal from the activation detector 340 indicating that a physical activation was detected, and responsive to this signal, the control module 350 transmits the enable signal to the NFC interface 310. In other embodiments, the activation module 330 alternatively or additionally transmits an enable signal to the configuration module 360.

The NFC interface 310 is enabled 430 in response to the enable signal so that the NFC interface 310 is fully functional. For example, in response to the enable signal, the NFC interface 310 turns on and allows another device to connect to the NFC interface 310 to exchange data and provide power to the NFC device 300. In some embodiments, the NFC interface 310 is functional to receive power but not data in the non-enabled mode, and the enable signal instructs the NFC interface 310 to accept both power and data.

The configuration module 360 receives 440 a configuration for the NFC device 300. For example, the NFC device 300 connects to a configuring device 210 via the enabled NFC interface 310, and the configuration module 360 receives configuration instructions via the NFC interface 310. The configuration module 360 then stores 450 the configuration information in the memory 380.

At the conclusion of the process 400, the NFC device 300 is activated and configured to provide authorization information for the user to a reader device 260.

Figure 5:
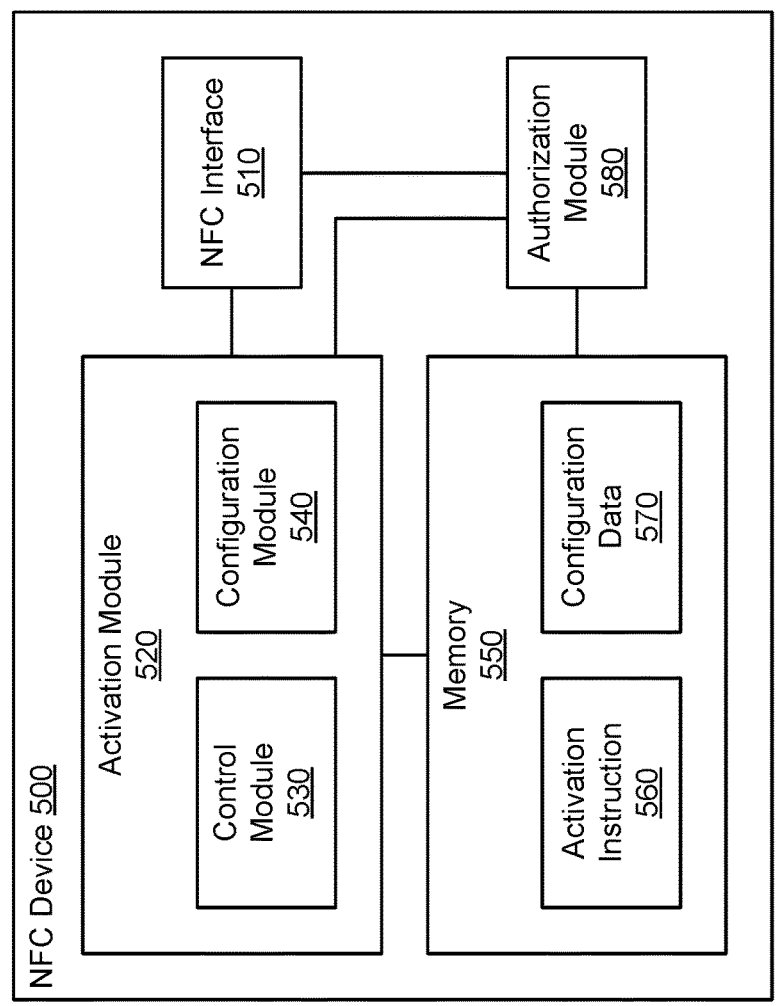
FIG. 5 is a block diagram illustrating a second NFC device, according to one embodiment.

FIG. 5 is a block diagram illustrating a second NFC device 500, according to one embodiment. Unlike the NFC device 300 shown in FIG. 3, the second NFC device 500 does not include an activation sensor 320 for detecting a physical activation operation. Instead, the NFC device 500 is activated via the NFC interface 510. The NFC device 500 includes an NFC interface 510, an activation module 520, a memory 550, and an authorization module 580. Some embodiments of the NFC device 500 have different modules than those described here. The functions can be distributed among the modules in a different manner than is described here.

The NFC interface 510 is similar to the NFC interface 310 described with respect to FIG. 3. However, in the embodiment shown in FIG. 5, the NFC interface 510 is functional while the NFC device 500 is in the non-enabled mode. In some embodiments, the NFC interface 510 may have limited functionality during the non-enabled mode. For example, when the NFC device 500 is configured in the non-enabled mode, the NFC interface 510 may be configured to transmit data, but not receive data, until an activation signal is received at the NFC interface 510. In this example, the NFC interface 510 ignores all data transmitted to the NFC device 500 (other than the activation signal) while the NFC device 500 is in the non-enabled mode. Alternatively, during the non-enabled mode, the NFC interface 510 may be configured to both transmit and receive data, and other modules of the NFC device 500, such as the configuration module 540, are configured to ignore the received data until the activation signal is received.

The activation module 520 includes a control module 530 and a configuration module 540. Like the control module 350 of FIG. 3, the control module 530 configures the NFC device 500 in either the non-enabled mode or the enabled mode, initially configuring the NFC device 500 in the non-enabled mode. In the non-enabled mode, the control module 530 limits the functionality of the configuration module 540 and/or the NFC interface 510 until an activation signal is received via the NFC interface 510. In response to receiving the activation signal from the NFC interface 510, the control module 530 transmits instructions to fully enable the configuration module 540 and/or the NFC interface 510. In some embodiments, the activation signal is cryptographically signed by an activating device. The control module 530 is pre-programmed to verify the cryptographic signature provided by the activating device and determine that the activating device is a verified user.

The configuration module 540 receives configuration information from the configuring device 210 so that the NFC device 500 can provide authorization information for the user to the reader device 260. During the non-enabled mode, the configuration module 540 has limited functionality, so that an unauthorized device 130 is blocked from configuring the NFC device 500. In the non-enabled mode, the configuration module 540 transmits an activation instruction 560 stored in the memory to the NFC interface 510, which transmits the activation instruction 560 to a connected device, such as the unauthorized device 130 or the configuring device 210. The configuration module 540 does not perform any further steps of the configuration process until the control module 530 activates the NFC device 500 responsive to the activation signal. As mentioned above, during the non-enabled mode, the NFC interface 510 may reject all received signals other than the activation signal, thus protecting the configuration module 540 from unauthorized configuration attempts. Alternatively, the configuration module 540 itself may ignore configuration attempts while it is configured in the non-enabled mode.

After the NFC device 500 has been activated, the configuration module 540 performs a configuration process with the configuring device 210 and receives instructions from the configuring device 210 for generating a one-time passcode for a user. The configuration module 540 performs a similar configuration process to the configuration process described with respect to FIG. 3, and stores the configuration instructions as configuration data 570 in the memory 550.

The memory 550 stores the activation instruction 560. The activation instruction 560 is an instruction to an activating device (e.g., the configuring device 210) to activate and configure the NFC device 500. For example, the activation instruction 560 may be a URL that directs the configuring device 210 to a web page that initiates a process of configuring the NFC device 500. In some embodiments, the process initiated on the activating device involves an exchange of information between a user, the activating device, and a web server. For example, the user inputs to the activating device a unique activation code that is visible to the user after the user opens the package containing the NFC device 500, e.g., responsive to a request on a web page transmitted by the web server that a user enter a serial number located inside the packaging. Alternatively, the web page may instruct the user use the activating device to take a photo of a QR code that is visible after the user opens the packaging containing the NFC device 500. The activation code may be behind a scratch-off material that can be removed by a user with a coin. The activating device transmits the information revealed in the packaging to the web server, which confirms that the authorization device may be enabled. For example, the activation instruction 560 may include the same activation code on the packaging, or a second code correlated at the web server to the activation code on the packaging. The web server confirms that the activation code on the packaging entered by the user matches, or is associated with, the activation code in the activation instruction 560. In response to determining that the activation code from the package matches the activation code in the activation instruction 560, the configuring device 210 transmits an activation signal to the NFC device 500.

In another embodiment, NFC device 500 compares a code in the activation signal to an on-device activation code stored in the memory 550. As in the prior embodiment, the user inputs to the activating device an activation code that is visible to the user after opening the package containing the NFC device 500, and the activation code is transmitted to a web server. The web server instructs the activating device to transmit an activation signal with a code based on the activation code from the packaging. The activating device transmits the activation signal to the NFC device 500 via the NFC interface 510, and the activation module 520 (e.g., the configuration module 540) compares the code in the activation signal to the activation code stored in the memory 550. If the two codes match, the configuration module enables the NFC device 500.

In another embodiment, the process initiated on the activating device responsive to the activation instruction 560 requests that a user provide information identifying the user to activate the NFC device 500. For example, the activation instruction directs the configuring device 210 to a web page that requests the user to enter a unique user name and, optionally, a password. The user name and password identify the user to the entity manufacturing or selling the NFC device 500, or to an entity that issues the NFC device 500 to the user (e.g., the user's employer). In response to receiving and verifying the user information, the configuring device 210 transmits the activation signal to the NFC interface 510. An authorization system (e.g., a web server) providing the web page stores the user information and along with information uniquely identifying the NFC device 500, such as a serial number. The information identifying the NFC device 500 may be assigned by the server during activation, or it may be provided by the NFC device 500 in the activation instruction 560. While this embodiment may not prevent an unauthorized user from activating and tampering with the NFC device 500, an activation process in which activating users identify themselves to the authorization system prevents unauthorized users from tampering with NFC devices anonymously and reduces the likelihood that unauthorized users tamper with NFC devices.

The configuration module 540 stores instructions and any other data received from the configuring device 210 during the configuration process in the memory 550 as configuration data 570. The configuration data 570 is accessed by the authorization module 580 to generate authorization information. The authorization module 580 is similar to the authorization module 370 described with respect to FIG. 3.

Figure 6:
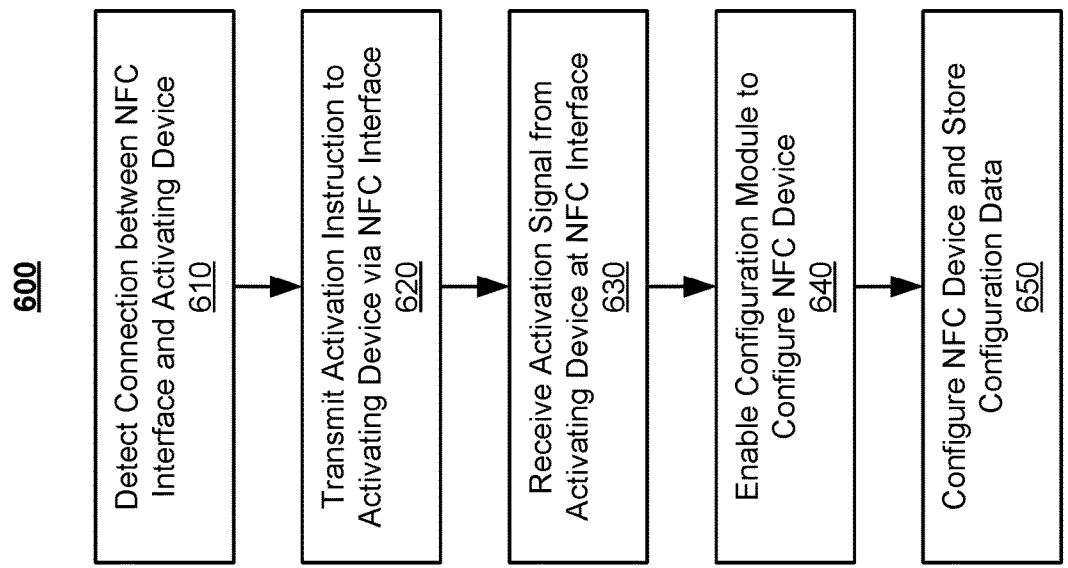
FIG. 6 is a flowchart illustrating a process for activating the NFC device shown in FIG. 5, according to an embodiment.

FIG. 6 is a flowchart illustrating a process 600 for activating the NFC device 500 shown in FIG. 5, according to an embodiment. The activation module 520 detects 610 a connection between the NFC interface 510 and the configuring device 210. For example, the configuration module 540, configured in a low-functionality non-enabled mode, detects the connection between the NFC interface 510 and the configuring device 210.

The activation module 520 transmits 620 an activation instruction to the configuring device 210 via the NFC interface 510. For example, the configuration module 540 retrieves the activation instruction 560 from the memory 550 and transmits the activation instruction 560 to the configuring device 210.

In response to the transmitted activation instruction, the NFC interface 510 receives 630 an activation signal from the configuring device 210. For example, the configuring device 210 may provide the activating signal in response to receiving user identification information. Alternatively, the configuring device 210 may provide the activating signal in response to matching an activation code in the activation instruction 560 to an activation code provide by the user and read from the opened packaging of the NFC device 500.

The activation module 520 enables 640 the configuration module 540 to configure the NFC device 500. For example, the control module 530 detects the activation signal received at the NFC interface 510 and, in response, enables the NFC device 500 by placing the configuration module 540 in a full functionality mode in which it can carry out the configuration process with the configuring device 210.

The configuration module 540 configures 650 the NFC device and stores the configuration data. For example, the configuration module 540 performs a configuration process with the configuring device 210 that involves receiving configuration data 570 for generating an authorization passcode, and storing the configuration data 570 in the memory 550 of the NFC device 500.

In an alternate embodiment, an NFC device is enabled while it is in its packaging, and is able to wirelessly communicate with any device, e.g., an unauthorized device 130, a configuring device 210, or a reader device 260. The NFC device is configured to send a flag indicating whether it has been previously interacted with, e.g., whether the NFC device has been configured or read. This flag indicates to an authorized user whether the NFC device has been tampered with or not. For example, before the NFC device is configured, the NFC device is configured to send a flag value indicating that the NFC device is unconfigured. After the NFC device has been configured, the NFC device no longer sends the flag value, or sends a different flag value indicating that the NFC device is configured. As another example, before the NFC device is read, the NFC device is configured to send a flag value indicating that the NFC device has not been read. After the NFC device has been configured, the NFC device no longer sends the flag value, or sends a different flag value indicating that the NFC device has been read a first time. Thus, the authorized end user can determine whether the NFC device has been tampered with based on whether the end user's device receives the unread flag and/or unconfigured flag before the authorized end user's device first reads or configures the NFC device.

Other Considerations

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for featuring a media content item. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

What is claimed is:

1. An authorization device comprising:
memory comprising instructions thereon;
a wireless interface; and
one or more processors that, when executing the instructions, are caused to perform operations comprising:
  detecting, at an authorization device having a wireless interface that is disabled from receiving data, a power connection at a physical connector of the authorization device, wherein the authorization device was disabled from receiving data in connection with being inserted into packaging that obscures an ability to form the power connection without removing the packaging;
  in response to detecting the power connection, enabling the wireless interface to receive data based on the power connection indicating that the packaging has been removed from the authorization device;
  receiving, by way of the wireless interface, a request to re-configure the authorization device; and
  re-configuring the authorization device based on the request, the re-configuring enabling the authorization device to transmit authorization information to a reader device by way of the wireless interface.

2. The authorization device of claim 1, wherein the authorization device is disabled from being configured when the wireless interface is configured to be disabled from receiving data, and wherein the authorization device is enabled to be configured when the wireless interface is enabled to receive data.

3. The authorization device of claim 1, the power connection being part of a detected activation operation, wherein detecting the activation operation comprises:
  receiving an activation of one of a touch sensor or a biometric sensor of the authorization device by a user.

4. The authorization device of claim 1, the power connection being part of a detected activation operation, wherein the activation operation includes a detection of a physical connection to a configuring device.

5. The authorization device of claim 1, the power connection being part of a detected activation operation, wherein detecting the activation operation comprises:
  forming a data connection between a configuring device and the wireless interface of the authorization device;
  transmitting an activation instruction via the data connection to the configuring device;
  receiving an activation signal from the configuring device via the data connection; and
  comparing a code in the activation signal to a stored activation code to determine that the code in the activation signal matches a stored activation code.

6. A method for activating an authorization device comprising:
  detecting, at an authorization device having a wireless interface that is disabled from receiving data, a power connection at a physical connector of the authorization device, wherein the authorization device was disabled from receiving data in connection with being inserted into packaging that obscures an ability to form the power connection without removing the packaging;
  in response to detecting the power connection, enabling the wireless interface to receive data based on the power connection indicating that the packaging has been removed from the authorization device;
  receiving, by way of the wireless interface, a request to re-configure the authorization device; and
  re-configuring the authorization device based on the request, the re-configuring enabling the authorization device to transmit authorization information to a reader device by way of the wireless interface.

7. The method of claim 6, wherein the authorization device is disabled from being configured when the wireless interface is configured to be disabled from receiving data, and wherein the authorization device is enabled to be configured when the wireless interface is enabled to receive data.

8. The method of claim 6, the power connection being part of a detected activation operation, wherein detecting the activation operation comprises:
  receiving an activation of one of a touch sensor or a biometric sensor of the authorization device by a user.

9. The method of claim 6, the power connection being part of a detected activation operation, wherein the activation operation includes a detection of a physical connection to a configuring device.

10. The method of claim 6, the power connection being part of a detected activation operation, wherein detecting the activation operation comprises:
  forming a data connection between a configuring device and the wireless interface of the authorization device;
  transmitting an activation instruction via the data connection to the configuring device;
  receiving an activation signal from the configuring device via the data connection; and
  comparing a code in the activation signal to a stored activation code to determine that the code in the activation signal matches a stored activation code.

11. The method of claim 6, the power connection being part of a detected activation operation, wherein the activation operation comprises:
  forming a data connection between a configuring device and the wireless interface of the authorization device;
  transmitting an activation instruction via the data connection to the configuring device, the activation instruction comprising an activation code; and
  receiving an activation signal from the configuring device via the data connection, wherein the configuring device transmits the activation signal to the authorization device in response to receiving an activation code input by a user that corresponds to the activation code received in the activation instruction.

12. A non-transitory computer-readable medium comprising memory with instructions encoded thereon for activating an authorization device, the instructions, when executed, causing one or more processors to perform operations, the instructions comprising instructions to:
  detect, at an authorization device having a wireless interface that is disabled from receiving data, a power connection at a physical connector of the authorization device, wherein the authorization device was disabled from receiving data in connection with being inserted into packaging that obscures an ability to form the power connection without removing the packaging;
  in response to detecting the power connection, enable the wireless interface to receive data based on the power connection indicating that the packaging has been removed from the authorization device;
  receive, by way of the wireless interface, a request to re-configure the authorization device; and re-configure the authorization device based on the request, the re-configuring enabling the authorization device to transmit authorization information to a reader device by way of the wireless interface.

13. The non-transitory computer-readable medium of claim 12, wherein the authorization device is disabled from being configured when the wireless interface is configured to be disabled from receiving data, and wherein the authorization device is enabled to be configured when the wireless interface is enabled to receive data.

14. The non-transitory computer-readable medium of claim 12, the power connection being part of a detected activation operation, wherein the instructions to detect the activation operation comprise instructions to:
  receive an activation of one of a touch sensor or a biometric sensor of the authorization device by a user.

15. The non-transitory computer-readable medium of claim 12, the power connection being part of a detected activation operation, wherein the activation operation includes a detection of a physical connection to a configuring device.

16. The non-transitory computer-readable medium of claim 12, the power connection being part of a detected activation operation, wherein the instructions to detect the activation operation comprise instructions to:
  form a data connection between a configuring device and the wireless interface of the authorization device;
  transmit an activation instruction via the data connection to the configuring device;
  receive an activation signal from the configuring device via the data connection; and
  compare a code in the activation signal to a stored activation code to determine that the code in the activation signal matches a stored activation code.

17. The non-transitory computer-readable medium of claim 12, the power connection being part of a detected activation operation, wherein the instructions to detect the activation operation comprise instructions to:
  form a data connection between a configuring device and the wireless interface of the authorization device;
  transmit an activation instruction via the data connection to the configuring device, the activation instruction comprising an activation code; and
  receive an activation signal from the configuring device via the data connection, wherein the configuring device transmits the activation signal to the authorization device in response to receiving an activation code input by a user that corresponds to the activation code received in the activation instruction.

* * * * *